United States Patent
Yamada et al.

(10) Patent No.: US 8,685,588 B2
(45) Date of Patent: Apr. 1, 2014

(54) MEMBRANE ELECTRODE ASSEMBLY, METHOD FOR PRODUCING THE SAME, AND SOLID POLYMER FUEL CELL USING THE SAME

(75) Inventors: Hideki Yamada, Tokyo (JP); Youichi Suzuki, Tokyo (JP); Hiroyoshi Fujimoto, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 815 days.

(21) Appl. No.: 12/374,681

(22) PCT Filed: Aug. 2, 2007

(86) PCT No.: PCT/JP2007/065572
§ 371 (c)(1),
(2), (4) Date: Oct. 30, 2009

(87) PCT Pub. No.: WO2008/016185
PCT Pub. Date: Feb. 7, 2008

(65) Prior Publication Data
US 2010/0047649 A1 Feb. 25, 2010

(30) Foreign Application Priority Data
Aug. 3, 2006 (JP) ................................ 2006-211639

(51) Int. Cl.
*H01M 2/18* (2006.01)
(52) U.S. Cl.
USPC ........................................................ 429/480
(58) Field of Classification Search
None
See application file for complete search history.

(56) References Cited

U.S. PATENT DOCUMENTS

| 7,504,174 B2 | 3/2009 | Lertola | 429/36 |
| 2004/0121215 A1 | 6/2004 | Fujii et al. | 429/35 |
| 2005/0014056 A1* | 1/2005 | Zuber et al. | 429/34 |
| 2005/0244703 A1* | 11/2005 | Osenar et al. | 429/35 |

FOREIGN PATENT DOCUMENTS

| JP | 3-101059 | 4/1991 |
| JP | 10-199551 | 7/1998 |
| JP | 2001-319337 | 11/2001 |
| JP | 2002-313371 | 10/2002 |
| JP | 2003-017092 | 1/2003 |
| JP | 2003-068323 | 3/2003 |
| JP | 2005-339891 | 12/2005 |
| JP | 2007-066766 | 3/2007 |

OTHER PUBLICATIONS

Supplemental European Search Report (EP 07 79 2234) dated Jun. 14, 2010.

* cited by examiner

*Primary Examiner* — Patrick Ryan
*Assistant Examiner* — Wyatt McConnell
(74) *Attorney, Agent, or Firm* — Allan M. Wheatcraft

(57) ABSTRACT

The present invention provides a membrane electrode assembly that enhances the reliability, mechanical strength, and handling characteristics of a seal in a solid polymer electrolyte fuel cell. The membrane electrode assembly of the present invention comprises a membrane-electrode structure having electrode layers and gas diffusion layers on both sides of a polymer electrolyte membrane, and a resin frame provided in such a manner as to fully enclose the outer periphery of the electrolyte membrane and to enclose at least portions of the outer peripheries of the gas diffusion layers, the resin frame being provided so as to enclose the electrolyte membrane side. The gas diffusion layer and electrode layer on one side are stacked on a surface of the electrolyte membrane so that a surface region of the electrolyte membrane is left exposed. The gas diffusion layer on the opposite side extends all around the outer periphery of the electrolyte membrane. The resin frame is attached fixedly to at least a portion to the surface region.

14 Claims, 12 Drawing Sheets

(A)

(B)

(A)

(B)

(A)

(B)

MEMBRANE ELECTRODE ASSEMBLY, METHOD FOR PRODUCING THE SAME, AND SOLID POLYMER FUEL CELL USING THE SAME

TECHNICAL FIELD

The present invention relates to a membrane electrode assembly for use in a solid polymer electrolyte fuel cell.

BACKGROUND ART

In recent years, fuel cells have been attracting attention as high-efficiency energy conversion devices. Fuel cells are roughly classified, based on the type of the electrolyte used, into low-temperature operating fuel cells such as alkaline fuel cells, solid polymer electrolyte fuel cells, and phosphoric acid fuel cells, and high-temperature operating fuel cells such as molten carbonate fuel cells and solid oxide fuel cells. Among them, the solid polymer electrolyte fuel cell (PEFC) that uses an ionically conductive polymer electrolyte membrane as an electrolyte has been receiving attention as a power source for stationary use, automotive use, portable use, etc., because it is compact in construction, achieves high output density, does not use a liquid for the electrolyte, can operate at low temperatures, and can therefore be implemented in a simple system.

The basic principle of the solid polymer electrolyte fuel cell is that, with one side of the polymer electrolyte membrane exposed to a fuel gas (hydrogen or the like) and the other side to an oxidizer gas (air or the like), water is synthesized by a chemical reaction occurring across the polymer electrolyte membrane, and the resulting reaction energy is extracted as electrical energy. FIG. 1 is an exploded perspective view showing the structure of a conventional fuel cell, and FIG. 2 is a cross-sectional side view of its assembly. In FIGS. 1 and 2, reactant gases introduced through a gas flow passage formed in a separator pass through the polymer electrolyte membrane and cause electrochemical reactions to occur on porous catalytic electrodes, and the power generated here is recovered outside through the separator. As is apparent from this structure, the polymer electrolyte membrane and the porous catalytic electrodes must be physically joined together. A structure constructed by placing the porous catalytic electrodes on both sides of the polymer electrolyte membrane and forming them into an integral structure by thermal pressing or the like is generally called a membrane electrode assembly (MEA). Each MEA can be handled independently, and a gasket is placed between the MEA and the separator to prevent reactant gases from leaking outside. The polymer electrolyte membrane has ionic conductivity, and has the function of physically and electronically isolating the fuel electrode from the oxygen electrode because of its lack of air permeability and electron conductivity. If the size of the polymer electrolyte membrane is smaller than that of each porous catalytic electrode, electrical short-circuiting occurs between the porous catalytic electrodes within the MEA, and further, the oxidizer gas and the fuel gas mix together (cross leaking), resulting in the loss of its function as a cell. Accordingly, the area size of the polymer electrolyte membrane must be made the same as or larger than that of each porous catalytic electrode. In view of this, usually the polymer electrolyte membrane is formed extending beyond the edges of the porous catalytic electrodes, and a gas sealing and supporting structure is formed by sandwiching it between the gasket and the separator.

Since the polymer electrolyte membrane is formed from an extremely thin film material, the membrane is difficult to handle, and its peripheral edge which is important for reactant gas sealing may often become wrinkled, for example, when joining it to the electrodes or when assembling a plurality of unit cells to fabricate a cell stack. In a unit cell or a cell stack fabricated using such a wrinkled polymer electrolyte membrane, there is a high probability that reactant gases will leak out through the wrinkled portions. Even if the polymer electrolyte membrane is free from such wrinkles, the polymer electrolyte membrane is prone to damage as it is a component element having the least mechanical strength of all the component elements forming the stack. Accordingly, it is desired to reinforce the polymer electrolyte membrane structure in order to enhance the reliability, maintainability, etc. of the solid polymer electrolyte fuel cell. Furthermore, to prevent short-circuiting at the edge of the polymer electrolyte membrane, conventional MEAs have been made that incorporate a polymer electrolyte membrane having a larger area than the electrode layers, with the electrolyte membrane extending laterally beyond the edge of the electrode layers. However, when fabricating an MEA by using such an electrolyte membrane differently sized than the electrode layers, since there is a need to cut them separately and to position them relative to each other, the number of fabrication steps increases, resulting in reduced productivity.

It is known to provide a method for forming a unitized membrane electrode assembly having a thermoplastic polymer, seal against fluid permeation, seal, by applying a thermoplastic polymer by such means as injection molding or compression molding to the edge of an MEA having a polymer electrolyte membrane of the same size as or larger than the gas diffusion electrodes, wherein the thermoplastic polymer is impregnated into the sealing edges of the gas diffusion backings, and the seal envelops a peripheral region of both gas diffusion backings and the polymer electrolyte membrane (Tokuhyou (Published Japanese Translation of PCT Application) No. 2005-516350).

It is also known to provide a method wherein, in order to effectively reinforce the polymer electrolyte membrane and to greatly enhance the handling characteristics of the fuel cell structure, a frame member is press-fitted onto the outer periphery of the porous structures fixed to both sides of the polymer electrolyte membrane, thereby joining the frame member and the porous structures firmly and reliably (Japanese Unexamined Patent Publication No. H10-199551).

DISCLOSURE OF THE INVENTION

In the method disclosed in Tokuhyou (Published Japanese Translation of PCT Application) No. 2005-516350, if the thermoplastic polymer is applied by injection molding to the edge of the MEA that has a polymer electrolyte membrane larger than the gas diffusion electrodes, the electrolyte membrane extending beyond the edge of the gas diffusion electrodes may move due to the resin flow during the injection molding and be exposed on the surface, or a load may be applied to the electrolyte membrane portion at the edge of the gas diffusion electrodes, resulting in breakage, and for these reasons, gas leakage may occur. Further, in the method disclosed in Tokuhyou (Published Japanese Translation of PCT Application) No. 2005-516350, if the thermoplastic polymer is applied by injection molding to the edge of the MEA that has a polymer electrolyte membrane of the same size as the gas diffusion electrodes, the above problem does not occur, but since it is difficult to sufficiently impregnate the thermoplastic polymer into the gas diffusion electrodes, the joining between the thermoplastic polymer seal and the gas diffusion electrodes may become insufficient. Furthermore, since it is also difficult to accomplish reliable joining between the electrolyte membrane and the thermoplastic polymer seal, problems such as electrical short-circuiting between the electrodes, gas leakage through the joining portions, cell breakage, etc., can occur.

In the method disclosed in Japanese Unexamined Patent Publication No. H10-199551, since it is difficult to sufficiently press-fit the frame member onto the outer periphery of the porous structures so as to firmly join them together, and it is extremely difficult to reliably seal the boundary between the frame member and the MEA, problems such as gas leakage through the joining portions, cell breakage, etc., can also occur here.

Accordingly, it is an object of the present invention to enhance the reliability, mechanical strength, and handling characteristics of the seal in the solid polymer electrolyte fuel cell. It is another object of the invention to reduce the manufacturing cost of the solid polymer electrolyte fuel cell by reducing the required area size of the electrolyte membrane. It is still another object of the invention to enhance the production efficiency of the solid polymer electrolyte fuel cell by reducing the number of fabrication steps.

According to the present invention, there is provided (1) a membrane electrode assembly for use in a solid polymer electrolyte fuel cell, comprising:

a membrane-electrode structure which includes a polymer electrolyte membrane, a first electrode layer provided on one side of the electrolyte membrane, a first gas diffusion layer provided on an opposite side of the first electrode layer from the electrolyte membrane, a second electrode layer provided on the other side of the electrolyte membrane, and a second gas diffusion layer provided on an opposite side of the second electrode layer from the electrolyte membrane; and a resin frame which is provided in such a manner as to fully enclose an outer periphery of the electrolyte membrane and to enclose at least portions of outer peripheries of the first and second gas diffusion layers, the resin frame being provided so as to enclose the electrolyte membrane side, and wherein the first gas diffusion layer and the first electrode layer are stacked on a surface of the electrolyte membrane so that the outer periphery of the first gas diffusion layer entirely lies within a boundary defined by the outer periphery of the electrolyte membrane and so that a surface region of the electrolyte membrane is left exposed between the outer periphery of the first electrode layer and the outer periphery of the electrolyte membrane, all around the outer periphery of the first electrode layer, the second gas diffusion layer extends as far as at least a portion on a side opposite from the surface region, all around the outer periphery of the electrolyte membrane, and the resin frame is attached fixedly to at least a portion of the surface region.

According to the present invention, there is provided (2) a membrane electrode assembly as described in (1), wherein the resin frame is applied by die molding.

According to the present invention, there is provided (3) a membrane electrode assembly as described in (2), wherein the die molding is injection molding, reaction injection molding, or transfer molding.

According to the present invention, there is provided (4) a membrane electrode assembly as described in any one of (1) to (3), wherein the electrolyte membrane and the second gas diffusion layer have the same area size and are aligned in precise registry with each other.

According to the present invention, there is provided (5) a membrane electrode assembly as described in any one of (1) to (3), wherein the electrolyte membrane comprises two membranes having different area sizes, and the membrane located on the side that contacts the first electrode layer has the same area size as the first gas diffusion layer and is aligned in precise registry with the first gas diffusion layer, while the electrolyte membrane located on the side that contacts the second electrode layer has the same area size as the second gas diffusion layer and is aligned in precise registry with the second gas diffusion layer.

According to the present invention, there is provided (6) a membrane electrode assembly as described in (5), wherein the first electrode layer and/or the second electrode layer have the same area size as the first gas diffusion layer and/or the second gas diffusion layer, respectively, and are aligned in precise registry with the first gas diffusion layer and/or the second gas diffusion layer, respectively.

According to the present invention, there is provided (7) a membrane electrode assembly as described in any one of (1) to (6), wherein the resin frame is provided with a reactant gas flow passage.

According to the present invention, there is provided (8) a membrane electrode assembly as described in any one of (1) to (6), wherein the resin frame is provided with a projection for sealing purposes.

According to the present invention, there is provided (9) a membrane electrode assembly as described in any one of (1) to (6), wherein the resin frame is provided with a sealing member inserted therein.

According to the present invention, there is provided

(10) a membrane electrode assembly as described in any one of (1) to (6), wherein the resin frame is provided with a sealing member formed by double molding.

According to the present invention, there is provided

(11) a membrane electrode assembly as described in any one of (1) to (6), wherein the resin frame is provided with a separator positioning means.

According to the present invention, there is provided

(12) a membrane electrode assembly as described in any one of (1) to (6), wherein a reinforcing member is provided inside the resin frame.

According to the present invention, there is provided

(13) a membrane electrode assembly as described in any one of (1) to (6), wherein a sealing member is separately provided outside the resin frame.

According to the present invention, there is provided

(14) a membrane electrode assembly as described in any one of (1) to (6), wherein a separator positioning means is separately provided outside the resin frame.

According to the present invention, there is provided

(15) a method for fabricating a membrane electrode assembly for use in a solid polymer electrolyte fuel cell, comprising the steps of:

preparing a membrane-electrode structure, the membrane-electrode structure including a polymer electrolyte membrane, a first electrode layer provided on one side of the electrolyte membrane, a first gas diffusion layer provided on an opposite side of the first electrode layer from the electrolyte membrane, a second electrode layer provided on the other side of the electrolyte membrane, and a second gas diffusion layer provided on an opposite side of the second electrode layer from the electrolyte membrane, wherein the first gas diffusion layer and the first electrode layer are stacked on a surface of the electrolyte membrane so that an outer periphery of the first gas diffusion layer entirely lies within a boundary defined by an outer periphery of the electrolyte membrane and so that a surface region of the electrolyte membrane is left exposed between the outer periphery of the first electrode layer and the outer periphery of the electrolyte membrane, all around the outer periphery of the first electrode layer, and wherein the second gas diffusion layer extends as far as at least a portion on a side opposite from the surface region, all around the outer periphery of the electrolyte membrane; and forming a resin frame by die molding in such a manner as to fully enclose the outer periphery of the electrolyte membrane and to enclose at least portions of the outer peripheries of the first and second gas diffusion layers, the portions being located near the first and second electrode layers, respectively, and in such a manner as to attach the resin frame fixedly to at least a portion of the surface region.

According to the present invention, there is provided

(16) a method as described in (15), wherein the die molding is injection molding, reaction injection molding, or transfer molding.

According to the present invention, there is provided

(17) a method as described in (16), wherein a resin for forming the resin frame is introduced toward the surface region.

According to the present invention, there is provided

(18) a method for fabricating a membrane electrode assembly for use in a solid polymer electrolyte fuel cell, comprising the steps of:

preparing a membrane-electrode structure precursor sheet containing a polymer electrolyte membrane, an electrode layer provided on one side of the electrolyte membrane, and a gas diffusion layer provided on an opposite side of the electrode layer from the electrolyte membrane;

segmenting, from the membrane-electrode structure precursor sheet, first and second membrane-electrode structure precursor units having different area sizes;

forming a membrane-electrode structure by joining together the first and second membrane-electrode structure precursor units with one electrolyte membrane facing the other electrolyte membrane by placing the one electrolyte membrane on a surface of the other electrolyte membrane so that an outer periphery of the one electrolyte membrane entirely lies within a boundary defined by an outer periphery of the other electrolyte membrane and so that a surface region of the other electrolyte membrane is left exposed between the outer periphery of the one electrolyte membrane and the outer periphery of the other electrolyte membrane, all around the outer periphery of the one electrolyte membrane; and forming a resin frame by die molding in such a manner as to fully enclose the outer peripheries of the electrolyte membranes and to enclose at least portions of the outer peripheries of the gas diffusion layers, the portions being located near the electrode layers, and in such a manner as to attach the resin frame fixedly to at least a portion of the surface region.

According to the present invention, there is provided

(19) a method for fabricating a membrane electrode assembly for use in a solid polymer electrolyte fuel cell, comprising the steps of:

preparing an electrode structure precursor sheet containing a first electrode layer and a first gas diffusion layer provided on one side of the first electrode layer, and a membrane-electrode structure precursor sheet containing a polymer electrolyte membrane, a second electrode layer provided on one side of the electrolyte membrane, and a second gas diffusion layer provided on an opposite side of the second electrode layer from the electrolyte membrane;

segmenting an electrode structure precursor unit of a given area size from the electrode structure precursor sheet;

segmenting, from the membrane-electrode structure precursor sheet, a membrane-electrode structure precursor unit having a larger area size than the given area size;

joining the first electrode layer in the electrode structure precursor unit to the electrolyte membrane in the membrane-electrode structure precursor unit by stacking the first gas diffusion layer and the first electrode layer on a surface of the electrolyte membrane so that an outer periphery of the first gas diffusion layer entirely lies within a boundary defined by an outer periphery of the electrolyte membrane and so that a surface region of the electrolyte membrane is left exposed between the outer periphery of the first electrode layer and the outer periphery of the electrolyte membrane, all around the outer periphery of the first electrode layer; and forming a resin frame by die molding in such a manner as to fully enclose the outer periphery of the electrolyte membrane and to enclose at least portions of the outer peripheries of the first and second gas diffusion layers, the portions being located near the first and second electrode layers, respectively, and in such a manner as to attach the resin frame fixedly to at least a portion of the surface region.

According to the present invention, there is provided

(20) a solid polymer electrolyte fuel cell comprising a membrane electrode assembly described in any one of (1) to (14).

According to the present invention, the reliability, mechanical strength, and handling characteristics of the seal in the solid polymer electrolyte fuel cell are enhanced. Because of the enhanced mechanical strength and handling characteristics, a fuel cell stack can be assembled with good accuracy and in a simple manner. Further, according to the present invention, the manufacturing cost of the solid polymer electrolyte fuel cell is reduced by reducing the required area size of the electrolyte membrane. Furthermore, according to the present invention, the production efficiency of the solid polymer electrolyte fuel cell is enhanced by reducing the number of fabrication steps.

BEST MODE FOR CARRYING OUT THE INVENTION

The present invention will be described in detail below with reference to the drawings. It should be understood that the drawings are shown in schematic form for ease of understanding of the present invention and the components shown in the respective drawings are not drawn to scale to represent their actual sizes relative to each other in the embodiment of the invention.

Figure 1:
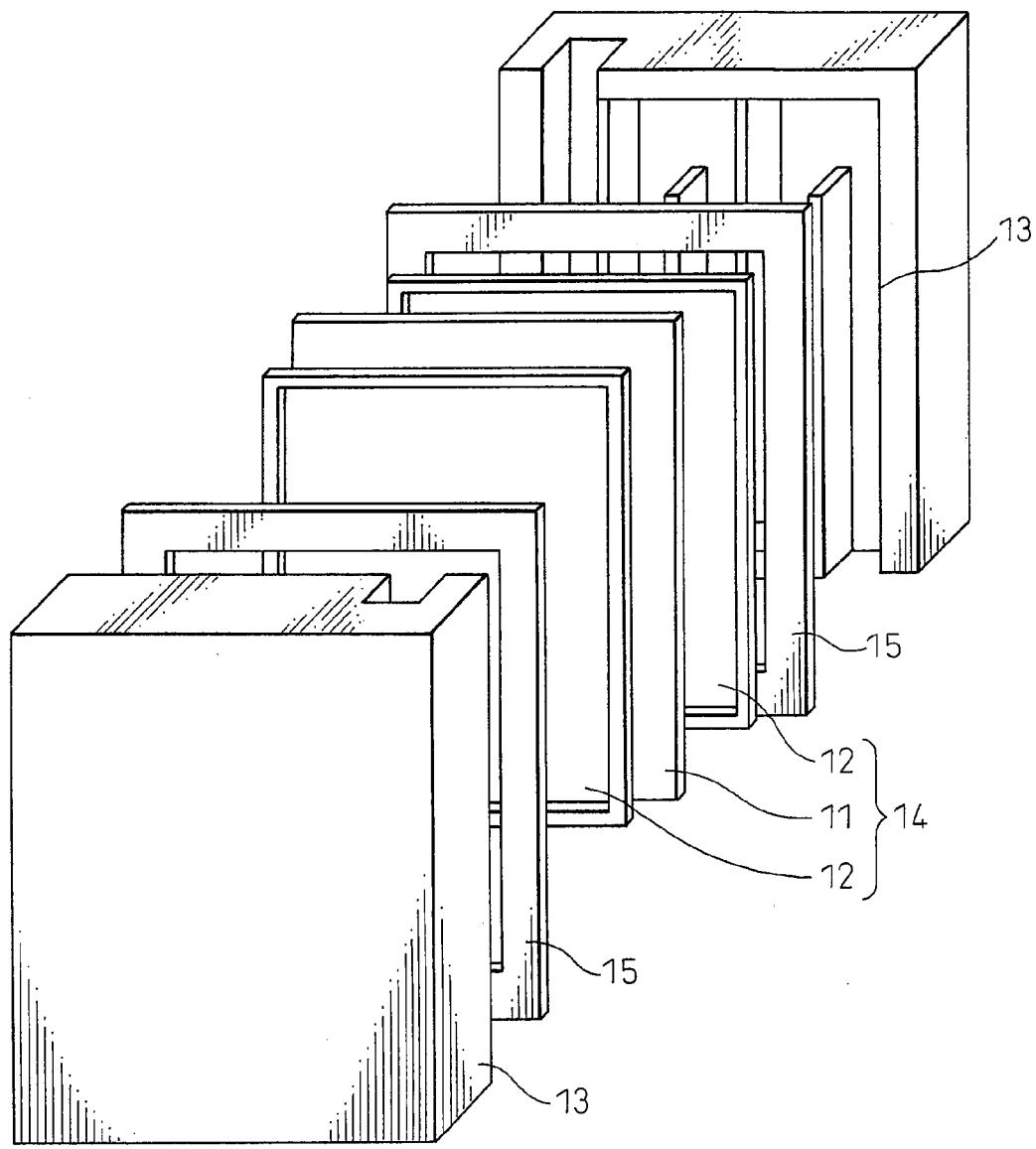
FIG. 1 is a schematic exploded perspective view showing the structure of a conventional fuel cell.
Figure 2:
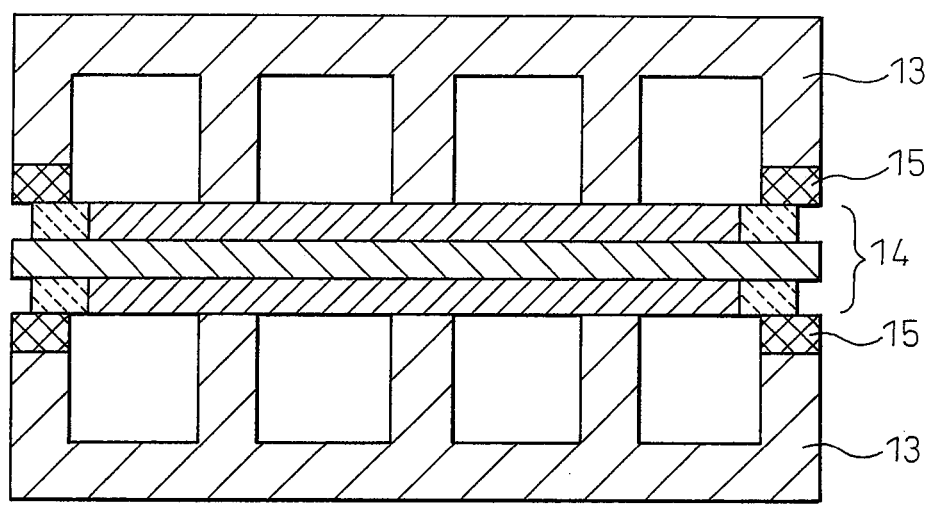
FIG. 2 is a schematic cross-sectional side view showing the basic structure of the conventional fuel cell.
Figure 2:
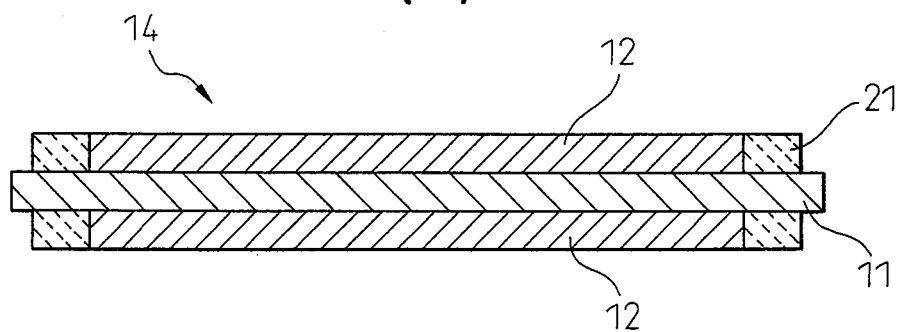
Figure 3:
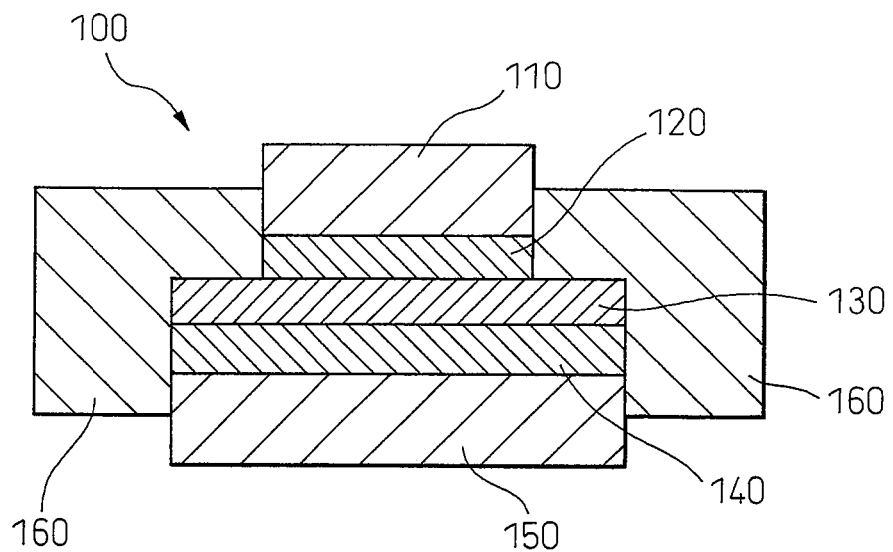
FIG. 3 is a schematic cross-sectional side view showing a membrane electrode assembly according to the present invention.

FIG. 3 shows one mode according to the present invention. A membrane electrode assembly 100 for use in a solid polymer electrolyte fuel cell according to the present invention comprises: a membrane-electrode structure which includes a polymer electrolyte membrane 130, a first electrode layer 120 provided on one side of the electrolyte membrane, a first gas diffusion layer 110 provided on an opposite side of the first electrode layer from the electrolyte membrane, a second electrode layer 140 provided on the other side of the electrolyte membrane, and a second gas diffusion layer 150 provided on an opposite side of the second electrode layer from the electrolyte membrane; and a resin frame 160 which is provided in such a manner as to fully enclose the outer periphery of the electrolyte membrane and to enclose at least portions of the outer peripheries of the first and second gas diffusion layers, the resin frame being provided so as to enclose the electrolyte membrane side. The first gas diffusion layer 110 and the first electrode layer 120 are stacked on a surface of the electrolyte membrane so that the outer periphery of the first gas diffusion layer 110 entirely lies within a boundary defined by the outer periphery of the electrolyte membrane 130 and so that a surface region of the electrolyte membrane 130 is left exposed between the outer periphery of the first electrode layer 120 and the outer periphery of the electrolyte membrane 130, all around the outer periphery of the first electrode layer 120. The second gas diffusion layer 150 extends as far as at least a portion on a side opposite from the surface region, all around the outer periphery of the electrolyte membrane 130, and the resin frame 160 is attached fixedly to at least a portion of the surface region. Since the second gas diffusion layer 150 is formed so as to extend as far as at least a portion on the side opposite from the surface region all around the outer periphery of the polymer electrolyte membrane 130, the electrolyte membrane is backed with the gas diffusion layer to provide a smooth surface having a certain degree of strength, and as a result, the electrolyte membrane does not buckle even when the resin frame is applied by die molding such as injection molding. Furthermore, since the resin frame 160 is attached fixedly to the surface region of the polymer electrolyte membrane 130, problems such as electrical short-circuiting between the first and second electrode layers, gas leakage through the joining portions, cell breakage, etc. can be resolved reliably. In the example shown in FIG. 3, the thickness of the resin frame 160 is smaller than the thickness of the membrane-electrode structure (110+120+130+140+150), but the resin frame 160 may be made to have a thickness substantially equal to or greater than that of the membrane-electrode structure.

Figure 4A:
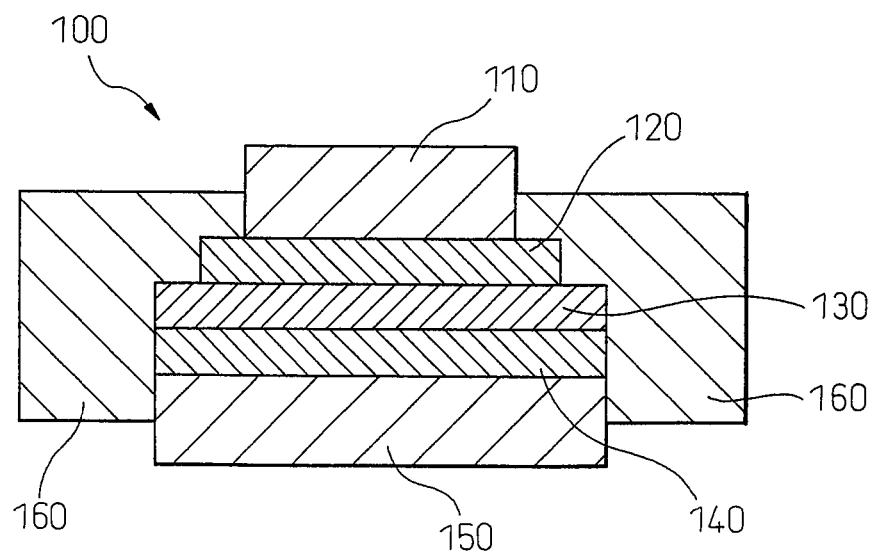
FIG. 4A is a schematic cross-sectional side view showing a membrane electrode assembly according to another mode of the present invention.
Figure 4B:
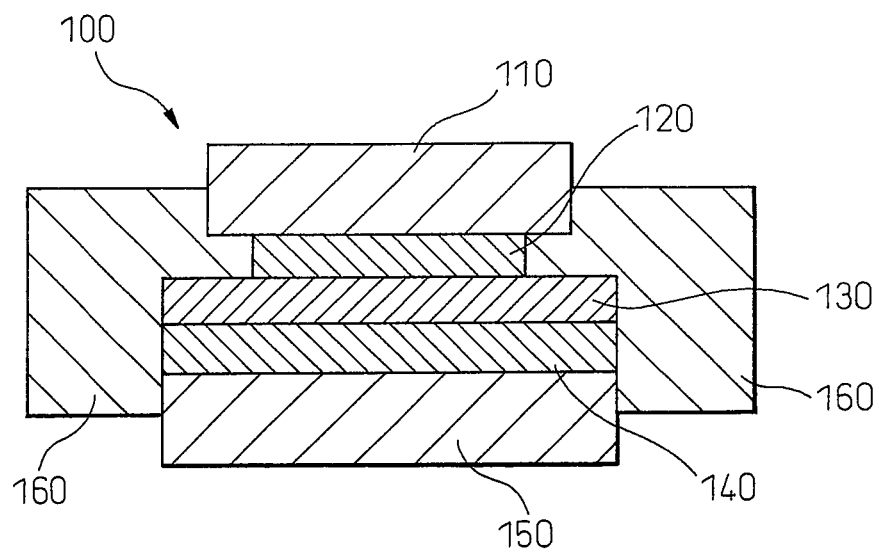
FIG. 4B is a schematic cross-sectional side view showing a membrane electrode assembly according to another mode of the present invention.
Figure 4C:
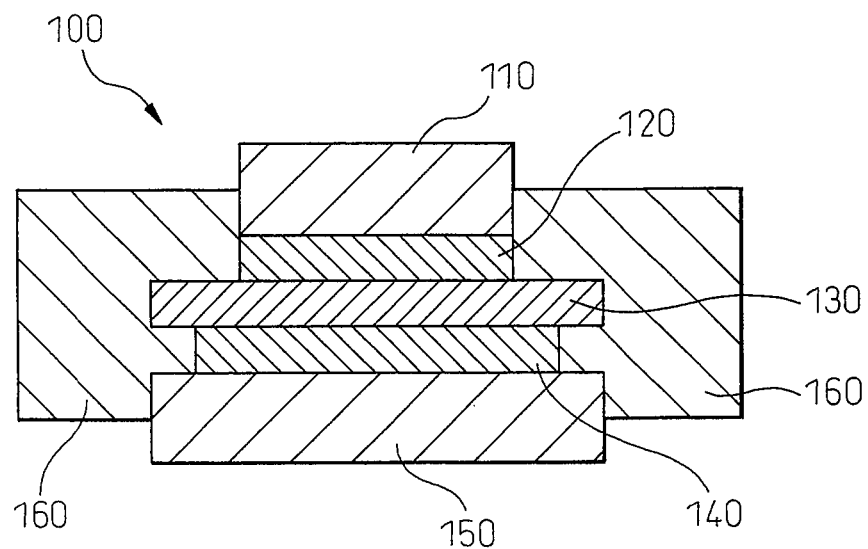
FIG. 4C is a schematic cross-sectional side view showing a membrane electrode assembly according to another mode of the present invention.
Figure 4D:
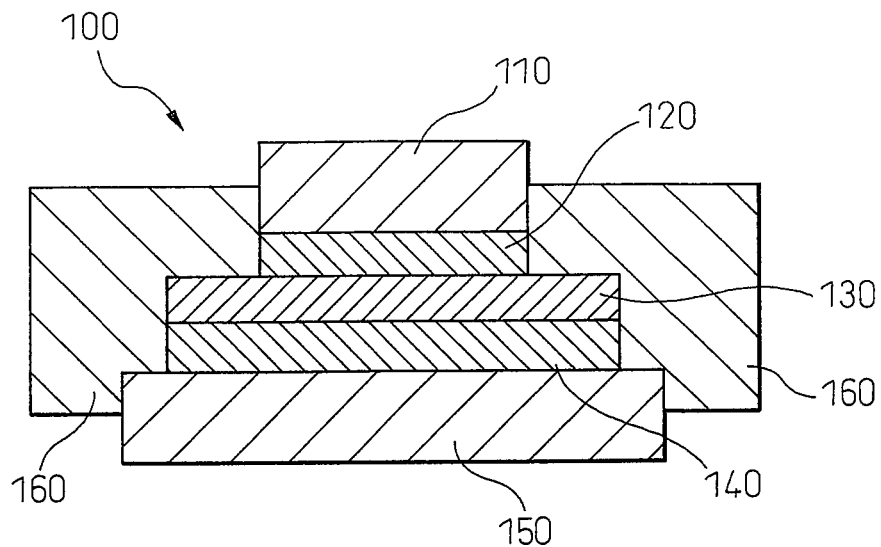
FIG. 4D is a schematic cross-sectional side view showing a membrane electrode assembly according to another mode of the present invention.
Figure 4E:
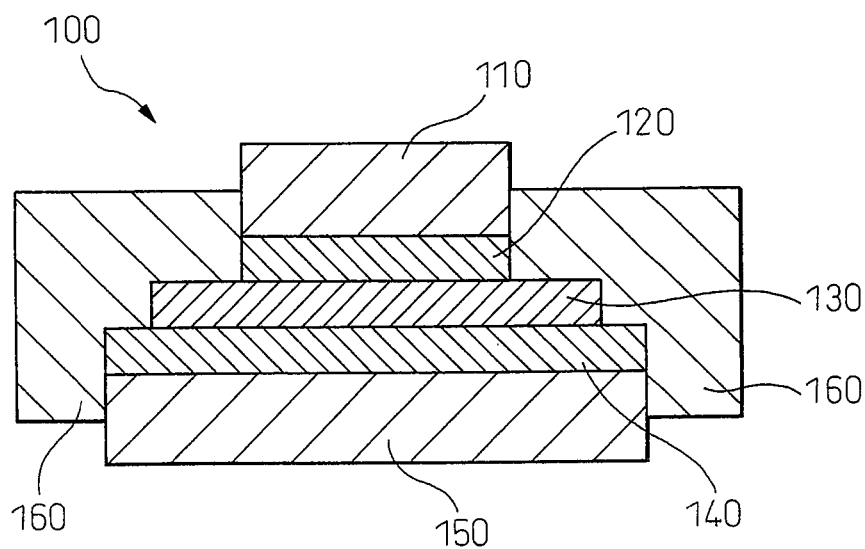
FIG. 4E is a schematic cross-sectional side view showing a membrane electrode assembly according to another mode of the present invention.

FIGS. 4A to 4E show modified modes of the membrane electrode assembly 100 shown in FIG. 3. The membrane electrode assembly 100 shown in FIG. 4A is essentially the same as the membrane electrode assembly 100 shown in FIG. 3, except that the outer periphery of the first gas diffusion layer 110 entirely lies within a boundary defined by the outer periphery of the first electrode layer 120. The membrane electrode assembly 100 shown in FIG. 4B is essentially the same as the membrane electrode assembly 100 shown in FIG. 3, except that the outer periphery of the first electrode layer 120 entirely lies within a boundary defined by the outer periphery of the first gas diffusion layer 110. The membrane electrode assembly 100 shown in FIG. 4C is essentially the same as the membrane electrode assembly 100 shown in FIG. 3, except that the outer periphery of the second electrode layer 140 entirely lies within a boundary defined by the outer peripheries of the polymer electrolyte membrane 130 and the second gas diffusion layer 150. The membrane electrode assembly 100 shown in FIG. 4D is essentially the same as the membrane electrode assembly 100 shown in FIG. 3, except that the outer peripheries of the polymer electrolyte membrane 130 and the second electrode layer 140 entirely lie within a boundary defined by the outer periphery of the second gas diffusion layer 150. The membrane electrode assembly 100 shown in FIG. 4E is essentially the same as the membrane electrode assembly 100 shown in FIG. 3, except that the outer periphery of the polymer electrolyte membrane 130 entirely lies within a boundary defined by the outer periphery of the second electrode layer 140. In any of the modified modes shown in FIGS. 4A to 4E, the first electrode layer 120 is formed on the surface of the electrolyte membrane so that the surface region of the electrolyte membrane 130 is left exposed between the outer periphery of the first electrode layer 120 and the outer periphery of the electrolyte membrane 130, all around the outer periphery of the first electrode layer 120, as in the mode shown in FIG. 3. In this case also, since the second gas diffusion layer 150 is formed so as to extend as far as at least a portion on the side opposite from the surface region all around the outer periphery of the polymer electrolyte membrane 130, the electrolyte membrane 130 is backed with the gas diffusion layer 150 to provide a smooth surface having a certain degree of strength, and as a result, the electrolyte membrane does not buckle even when the resin frame is applied by die molding such as injection molding. Furthermore, since the resin frame 160 is attached fixedly to the surface region of the polymer electrolyte membrane 130, problems such as electrical short-circuiting between the first and second electrode layers, gas leakage through the joining portions, cell breakage, etc. can be resolved reliably. In the modes shown in FIGS. 4A to 4E, the thickness of the resin frame 160 is smaller than the thickness of the membrane-electrode structure (110+120+130+140+150), but the resin frame 160 may be made to have a thickness substantially equal to or greater than that of the membrane-electrode structure.

Figure 5:
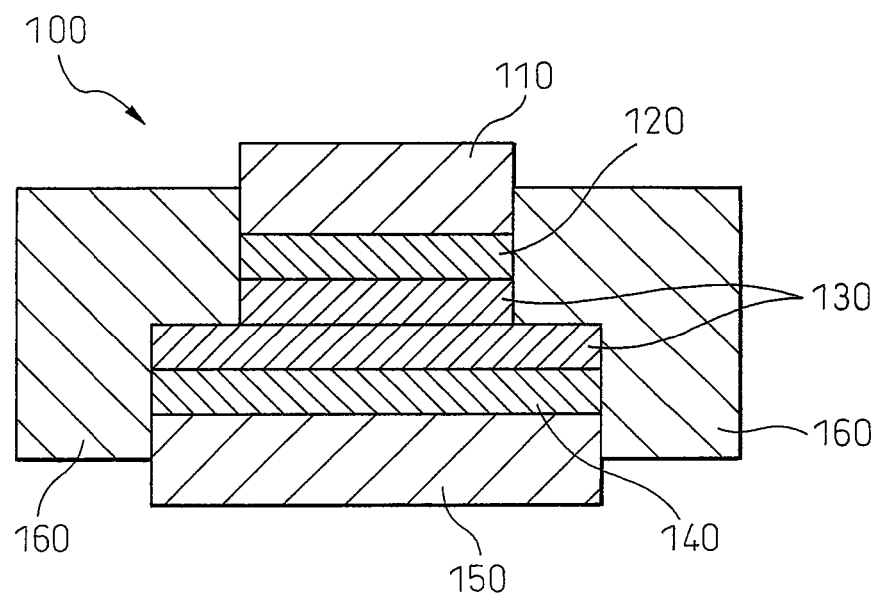
FIG. 5 is a schematic cross-sectional side view showing a membrane electrode assembly according to another mode of the present invention.

FIG. 5 shows another modified mode of the membrane electrode assembly 100 shown in FIG. 3. The membrane electrode assembly 100 shown in FIG. 5 is essentially the same as the membrane electrode assembly 100 shown in FIG. 3, except that the polymer electrolyte membrane 130 is formed from two layers, the outer periphery of one electrolyte membrane entirely lying within a boundary defined by the outer periphery of the other. According to the mode shown in FIG. 5, the electrolyte membrane does not buckle even when the resin frame is applied by die molding such as injection molding, and problems such as electrical short-circuiting between the first and second electrode layers, gas leakage through the joining portions, cell breakage, etc., can be resolved reliably, as in the example shown in FIG. 3; besides, the mode shown in FIG. 5 provides the additional benefit of increasing the production efficiency of the membrane electrode assembly 100, as will be described later with reference to FIG. 7.

Figure 6:
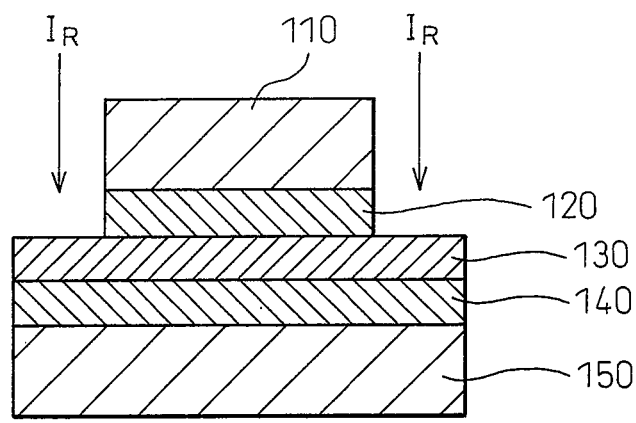
FIG. 6 is a diagram showing a schematic cross-sectional side view (A) and a top plan view (B) of a membrane-electrode structure prior to the application of a resin frame in the membrane electrode assembly according to the present invention.
Figure 6:
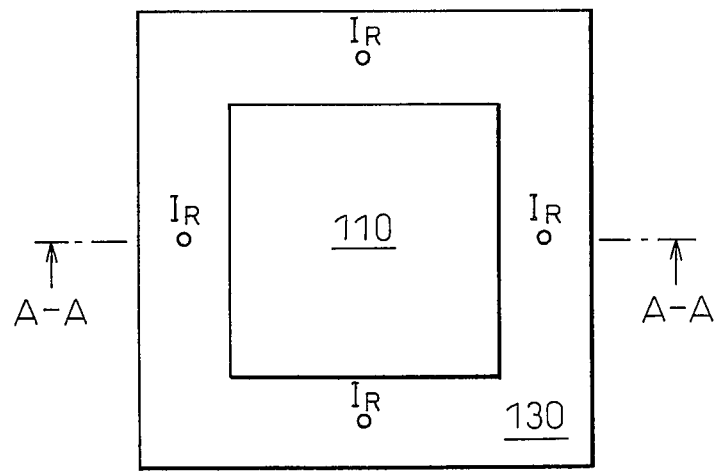

FIG. 6 shows a cross-sectional side view (A) and a top plan view (B) of the membrane-electrode structure prior to the application of the resin frame 160 in the membrane electrode assembly 100 shown in FIG. 3. In the figure, "$I_R$" indicates one example of a resin introduction position where the resin is introduced when applying the resin frame by die molding such as injection molding. By introducing the resin for forming the resin frame toward the surface region of the electrolyte membrane 130 backed with the gas diffusion layer 150 and having a certain degree of strength, the resin frame can be applied without causing the electrolyte membrane 130 to buckle. In FIG. 6(B), four resin introduction positions $I_R$ are shown, but their locations and the number of resin introduction positions are not limited to those shown here; for example, a mode in which $I_R$ is located in each corner of the electrolyte membrane 130 or a mode in which the number of resin introduction positions $I_R$ is smaller or larger than 4 also falls within the scope of the present invention.

Figure 7:
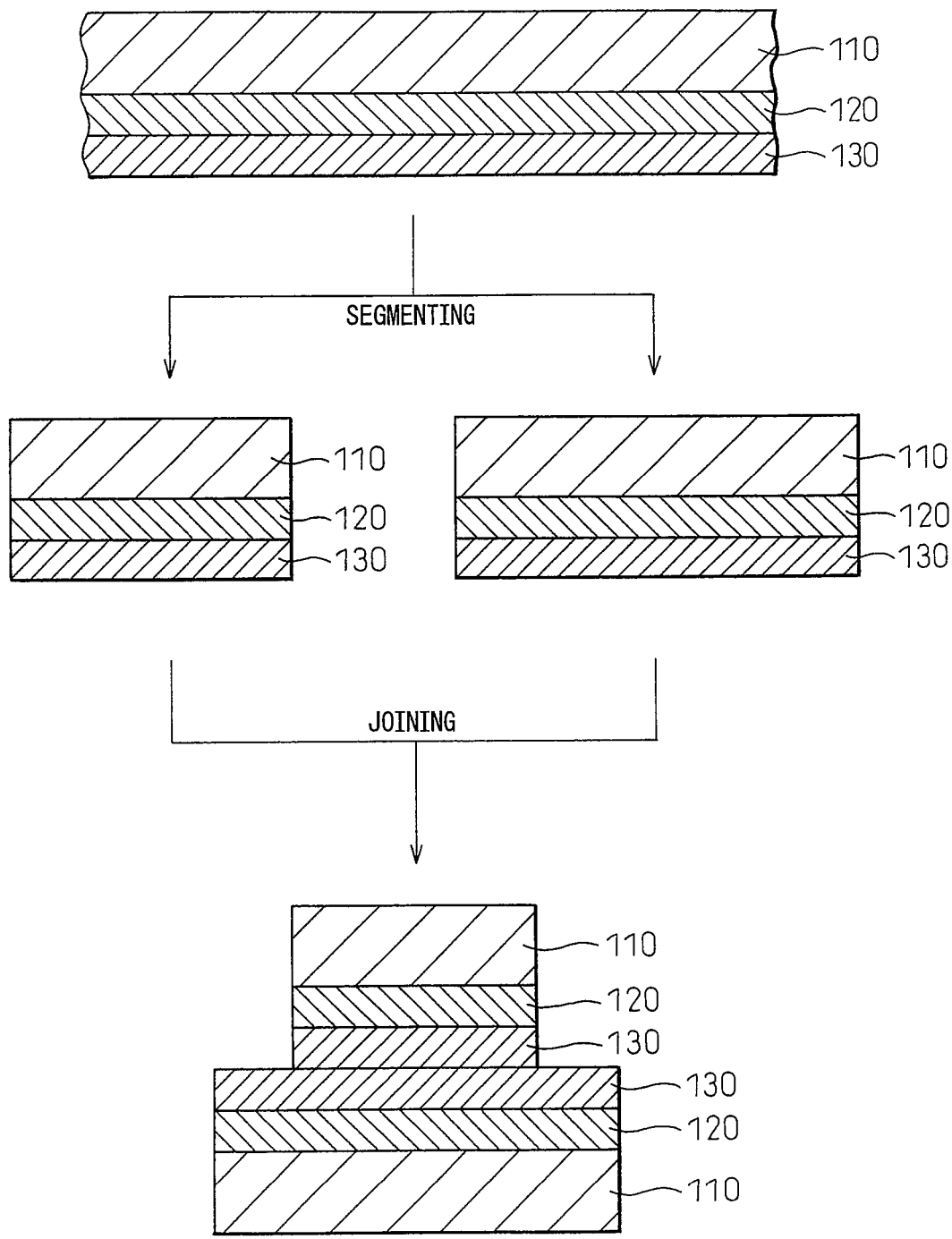
FIG. 7 is a schematic cross-sectional side view showing a portion of the fabrication process for the membrane electrode assembly according to the present invention.

FIG. 7 shows a portion of the fabrication process for the membrane electrode assembly 100 of FIG. 5. First, a membrane-electrode structure precursor sheet of a suitable size is prepared that contains the polymer electrolyte membrane 130, the electrode layer 120, and the gas diffusion layer 110. Next, first and second membrane-electrode structure precursor units having different area sizes are segmented from the membrane-electrode structure precursor sheet. It is preferable to round the corners of the membrane-electrode structure precursor units. The radius of curvature of the rounding should be made as small as possible so as not to affect the effective area of the polymer electrolyte membrane, but if the radius is smaller than 0.5 mm, the joining portions may come off at the corners during handling of the membrane-electrode structure precursor units, or may come off or break at the corners due to the resin flow during die molding. The radius of curvature of the rounding is preferably within a range of 0.5 to 2.0 mm, and more preferably within a range of 0.7 to 1.5 mm. After that, the first and second membrane-electrode structure precursor units are placed with their electrolyte membranes 130 facing each other, and then joined together to complete the membrane-electrode structure. At this time, one electrolyte membrane is placed on the surface of the other electrolyte membrane so that the outer periphery of the one electrolyte membrane entirely lies within the boundary defined by the outer periphery of the other electrolyte membrane, and so that the surface region of the other electrolyte membrane is left exposed between the outer periphery of the one electrolyte membrane and the outer periphery of the other electrolyte membrane, all around the outer periphery of the one electrode layer. Then, the resin frame (not shown) is applied by die molding in such a manner as to fully enclose the outer peripheries of the electrolyte membranes and to enclose at least the portions of the outer peripheries of the gas diffusion layers near the electrode layers, and in such a manner that the resin frame is attached fixedly to at least a portion of the surface region, thus completing the fabrication of the membrane electrode assembly 100 shown in FIG. 5. In this way, by using the suitably sized membrane-electrode structure precursor sheet containing the polymer electrolyte membrane 130, the electrode layer 120, and the gas diffusion layer 110, the production efficiency of the solid polymer electrolyte fuel cell can be enhanced, since the step of individually positioning the polymer electrolyte membrane 130, the electrode layer 120, and/or the gas diffusion layer 110 is eliminated.

Figure 8:
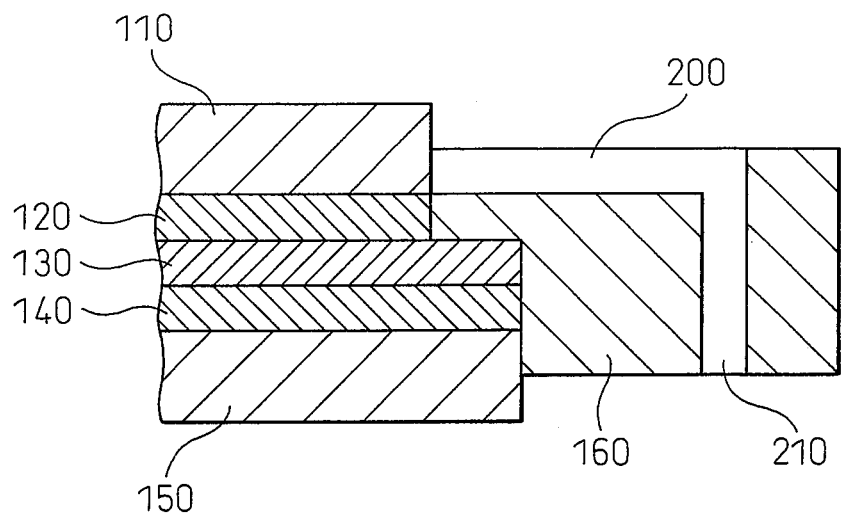
FIG. 8 is a schematic cross-sectional side view showing an additional feature provided to the resin frame.
Figure 9:
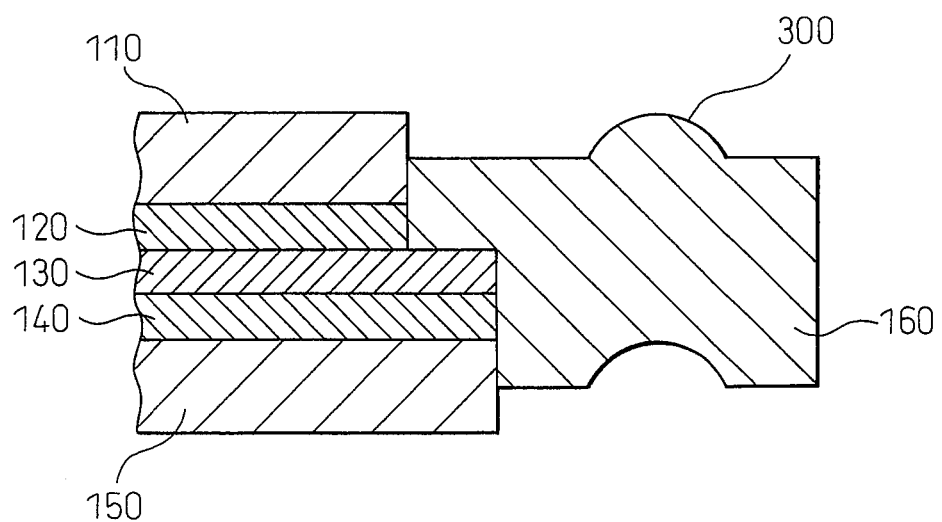
FIG. 9 is a schematic cross-sectional side view showing another additional feature provided to the resin frame.
Figure 10:
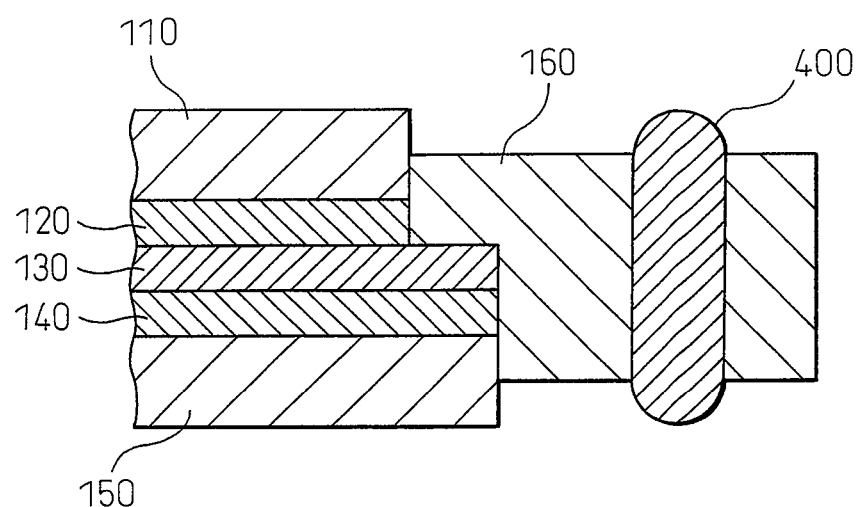
FIG. 10 is a schematic cross-sectional side view showing another additional feature provided to the resin frame.
Figure 10:
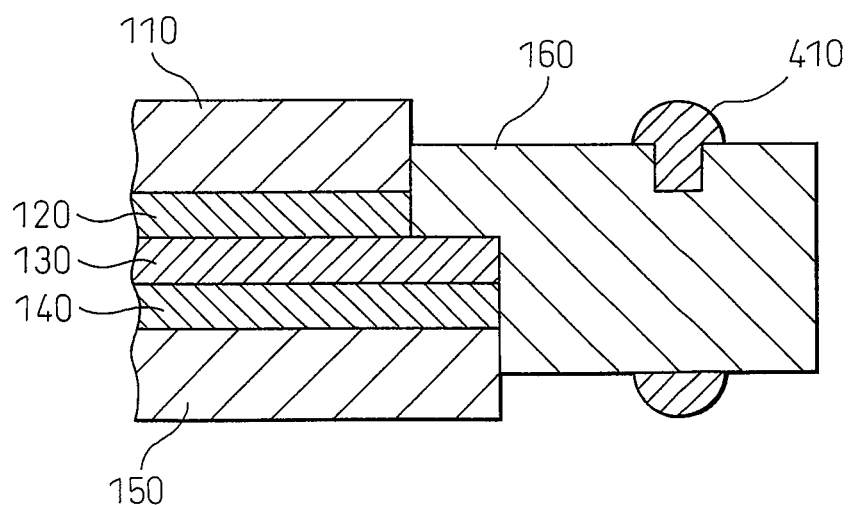
Figure 11:
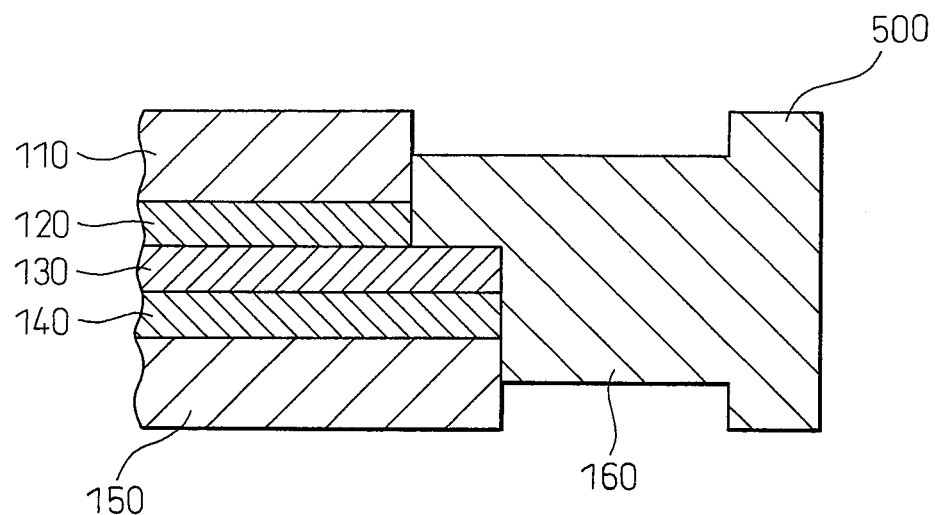
FIG. 11 is a schematic cross-sectional side view showing another additional feature provided to the resin frame.
Figure 12:
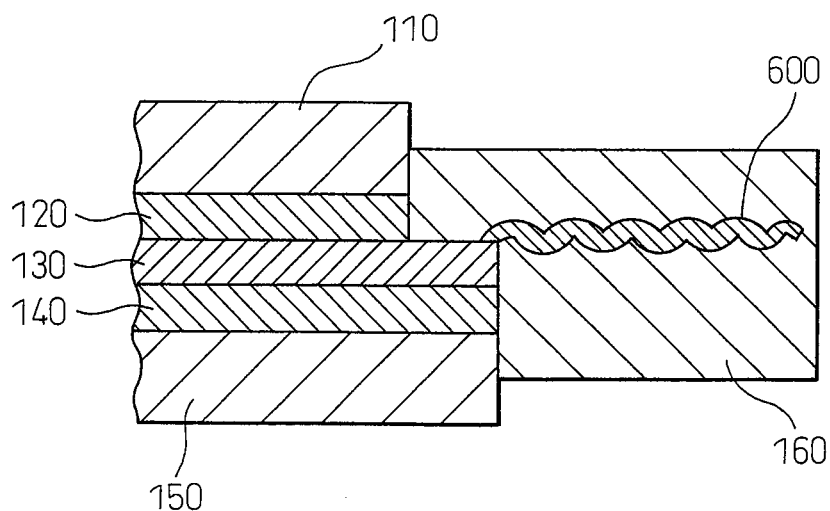
FIG. 12 is a schematic cross-sectional side view showing another additional feature provided to the resin frame.
Figure 13:
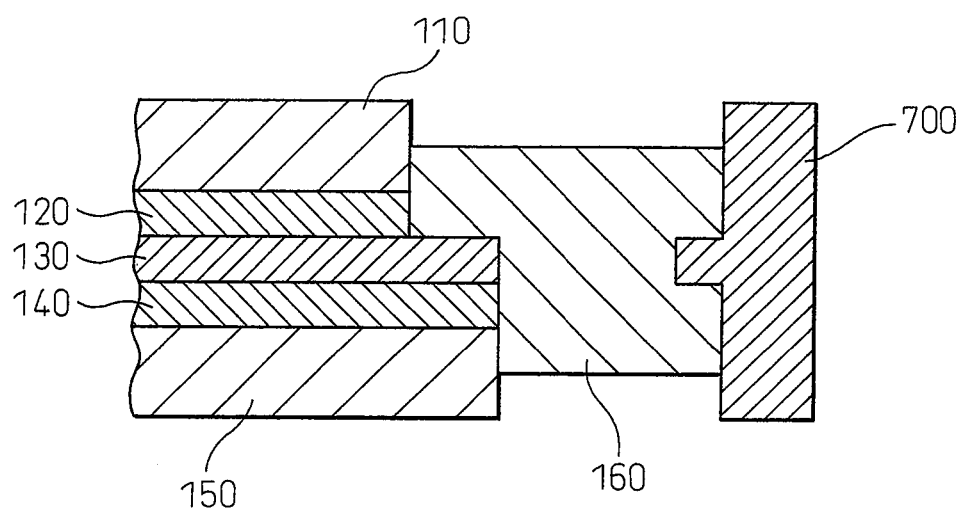
FIG. 13 is a schematic cross-sectional side view showing another additional feature provided to the resin frame.

According to the present invention, by using die molding techniques, any additional feature can be easily provided to the resin frame. For example, a reactant gas flow passage 200 and/or a manifold 210, which would usually be provided in the separator, can be provided in the resin frame 160, as shown in FIG. 8. Further, a seal portion 300 for the separator (not shown) can be formed by the resin frame 160 itself, as shown in FIG. 9. Furthermore, as shown in FIG. 10(A), a seal member 400 for the separator (not shown) can be inserted when molding the frame or, as shown in FIG. 10(B), a seal member 410 can be formed in integral fashion by double molding. Further, a positioning member 500 for the separator (not shown) can be formed by the resin frame 160 itself, as shown in FIG. 11. Furthermore, a reinforcing member 600 formed from fine wire, mesh, fiber, etc., can be inserted in the resin frame 160, as shown in FIG. 12. It is also possible to outsert a seal member and/or a positioning member 700 for the separator (not shown) onto the resin frame 160, as shown in FIG. 13. Specific methods, including double molding, for providing such additional features to the resin frame can be easily understood and practiced by any person skilled in the technical field of die molding.

The polymer electrolyte membrane used in the membrane electrode assembly according to the present invention is not specifically limited, but any known polymer electrolyte membrane can be used, as long as it has high proton ($H^+$) conductivity, is electronically insulative, and is impermeable to gasses. A typical example is a resin that has a fluorine-containing polymer as the backbone and has a group such as a sulfonic acid group, a carboxyl group, a phosphoric acid group, a phosphonate group, etc. Since the thickness of the polymer electrolyte membrane greatly affects resistance, it is required that the thickness be made as small as possible, as long as it does not impair the electronic insulation and gas impermeability; specifically, the thickness is chosen to fall within a range of 5 to 50 µm, and preferably within a range of 10 to 30 µm. Typical examples of the polymer electrolyte membrane include Nafion (registered trademark) membrane (manufactured by DuPont), which is a perfluoro polymer having a phosphoric acid group as a side chain, and Flemion (registered trademark) membrane (manufactured by Asahi Glass). Further, GORE-SELECT (registered trademark) (manufactured by Japan Gore-Tex), which is a reinforced polymer electrolyte membrane formed by impregnating an ion exchange resin into a microporous stretched polytetrafluoroethylene membrane, can also be used advantageously.

The electrode layer used in the membrane electrode assembly according to the present invention is not specifically limited, but any prior known one can be used, as long as it contains catalyst particles and an ion exchange resin. The catalyst is usually formed from an electrically conductive material loaded with catalyst particles. For the catalyst particles, any material that exhibits catalytic activity for the oxidation reaction of hydrogen or the reduction reaction of oxygen can be used, examples including platinum (Pt) and other noble metals, or iron, chromium, nickel, etc. and their alloys. For the electrically conductive material, carbon-based particles, such as carbon black, activated carbon, graphite, etc., are preferable, and among others, fine powered particles are preferably used. In a typical example, noble metal particles, for example, Pt particles, or alloy particles of Pt and some other metal are carried on carbon black particles having a area of 20 $m^2$/g or larger. In particular, for the catalyst to be used for the anode, when using a fuel, such as methanol, that contains carbon monoxide (CO), it is preferable to use ally particles of Pt and ruthenium (Ru) because Pt alone is easily poisoned by CO. The ion exchange resin in the electrode layer is a material that supports the catalyst and serves as a binder for forming the electrode layer, and has the role of forming a passage through which ions, etc., formed by catalyst reaction move. For such an ion exchange resin, a similar one to that described above in connection with the polymer electrolyte membrane can be used. It is preferable to form the electrode layer in a porous structure to maximize the area where the catalyst makes contact with the fuel gas, such as hydrogen or methanol, at the anode and the oxidizer gas, such as oxygen or air, at the cathode. The amount of catalyst contained in the electrode layer is preferably within a range of 0.01 to 1 mg/$cm^2$, and more preferably within a range of 0.1 to 0.5 mg/$cm^2$. The thickness of the electrode layer is generally within a range of 1 to 20 μm, and preferably within a range of 5 to 15 μm.

The gas diffusion layer used in the membrane electrode assembly according to the present invention is a sheet material having electrical conductivity and air permeability. A typical example is one prepared by applying water-repellent treatment to an air permeable, electrically conductive matrix such as carbon paper, carbon fabric, nonwoven fabric, carbon felt, etc. It is also possible to use a porous sheet formed from carbon-based particles and a fluorine-based resin. For example, use may be made of a porous sheet prepared by molding carbon black into a sheet using polytetrafluoroethylene as a binder. The thickness of the gas diffusion layer is generally within a range of 50 to 500 μm, and preferably within a range of 100 to 200 μm.

The membrane-electrode structure or the membrane-electrode structure precursor sheet is fabricated by joining together the electrode layer, the gas diffusion layer, and the polymer electrolyte membrane. For the joining method, any prior known method can be employed, as long as closely compacted joining with low contact resistance can be accomplished without damaging the polymer electrolyte membrane. In accomplishing the joining, an anode electrode or a cathode electrode can first be formed by combining the electrode layer with the gas diffusion layer, and then be joined to the polymer electrolyte membrane. For example, an electrode layer forming coating liquid that contains catalyst particles and an ion exchange resin is prepared using a suitable solvent, and the liquid thus prepared is applied over a gas diffusion layer forming sheet member, thereby forming an anode electrode or a cathode electrode, and the resulting structure can be joined to the polymer electrolyte membrane by hot pressing. Alternatively, the electrode layer may first be combined with the polymer electrolyte membrane, and then the gas diffusion layer may be bonded to the electrode layer side. When combining the electrode layer with the polymer electrolyte membrane, a prior known method, such as a screen printing method, a spray coating method, or a decal method, should be used.

For the resin frame used in the membrane electrode assembly according to the present invention, the use of a resin material that exhibits good stability, i.e., heat resistance, acid resistance, hydrolytic resistance, creep resistance, etc. in the normal operating environment of the fuel cell, is a prerequisite. It is preferable that the resin material has a property suitable for die molding, in particular, high flowability during molding. Furthermore, if the resin material is a thermoplastic resin, it is preferable that its molding shrinkage is small, and if it is a thermosetting resin, it is preferable that its curing shrinkage is small. Specific examples of the thermoplastic resin include plastics or elastomers such as a liquid crystal polymer (LCP), polyphenylene sulfide (PPS), polyether sulfone (PES), polysulfone (PSF), polyether ether ketone (PEEK), polyimide (PI), polybutylene terephthalate (PBT), polyamide (PA), polypropylene (PP), polyurethane, polyolefin, etc. Specific examples of the thermosetting resin include plastics or elastomers such as an epoxy resin, phenol resin, dicyclopentadiene resin, silicone rubber, fluoro rubber, ethylene propylenediene rubber (EPDM), etc.

The resin frame used in the membrane electrode assembly according to the present invention is applied by die molding. Die molding includes injection molding, reaction injection molding, transfer molding, compression molding, cast molding, etc., and a person skilled in the art can select a suitable molding method that matches the properties of the resin used. Since the MEA to which the resin frame is applied is as thin as several hundred micrometers, the mold for forming the resin frame must be made to fit this requirement. Further, to prevent the flimsy MEA from being crushed when clamping the mold, it is preferable to provide the mold with a telescopic structure so as to adjust the thickness of the MEA portion. It is also preferable to provide the mold with a suction mechanism for holding the MEA fixed in place to prevent the MEA from being displaced when clamping the mold. Among others, injection molding, reaction injection molding, and transfer molding are advantageous in that the series of operations such as the placement of the insert, molding, extraction of the molding, etc., can be fully automated.

A fuel cell stack can be assembled by stacking 10 to 100 cells, each comprising the membrane electrode assembly fabricated in the above manner, alternately between separator plates and cooling sections with the anode and cathode of each cell located on the designated sides.

EXAMPLES

The present invention will be described in detail below with reference to examples.

Example 1

Fabrication of the Membrane Electrode Assembly (MEA)

A platinum-loaded carbon catalyst layer PRIMEA 5510 (registered trademark) (manufactured by Japan Gore-Tex) having a size of 15×15 cm and carrying platinum in an amount of 0.3 mg/$cm^2$ was deposited as an electrode on one side of a polymer electrolyte membrane formed from an ion exchange membrane GORE-SELECT (registered trademark) (manufactured by Japan Gore-Tex) having a size of 15×15 cm and a thickness of 15 μm. Next, a gas diffusion layer CARBEL (registered trademark) (manufactured by Japan Gore-Tex, CNW10A) having a size of 15×15 cm and a thickness of 150 μm was deposited as a diffusion layer on the electrode, to form a membrane-electrode structure precursor sheet. Then, two differently sized membrane-electrode structure precursor units, one measuring 52×52 mm and the other 56×56 mm, were segmented from the membrane-electrode structure precursor sheet. The corners of the 52×52 mm membrane-electrode structure precursor unit were each rounded with a radius of curvature of 1.0 mm. The two membrane-electrode structure precursor units were placed with their centers aligned and their polymer electrolyte membranes facing each other, and then bonded together under heat and pressure (160° C., $9.8 \times 10^5$ Pa, 5 minutes) by using a hot press. After that, the corners of the 56×56 mm membrane-electrode structure precursor unit were each rounded with a radius of curvature of 2.0 mm, to complete the fabrication of the MEA.

Mold Making

A mold for forming a resin frame around the MEA was made. The mold was chosen to have a form size of 76×76 mm and a form thickness of 0.35 mm. The mold was provided with a telescopic structure so as to be able to adjust the thickness of the MEA relatively freely in order to prevent the MEA from being excessively crushed. Furthermore, the mold was provided with a suction mechanism for holding the MEA fixed in place to prevent the MEA from being displaced when clamping the mold. The mold cavity was provide with four gates corresponding to four resin introduction positions $I_R$ such as shown in FIG. 6.

Injection Molding of the Resin Frame

The above mold was installed on an injection molding machine (SE-100D, manufactured by Sumitomo Heavy Industries). The resin (Vectra D408, manufactured by Polyplastics) for forming the resin frame was dried at 140° C. for four hours in a hot air drier. The thus dried resin was placed into the hopper of the injection molding machine, and the resin was heated to 330° C. After the temperature of the mold reached 55° C., using an automatic transfer machine (manufactured by Yushin Precision Equipment) the MEA was placed in a designated position within the mold by aligning the four gates with the respective resin introduction positions. The MEA was held fixed in place by operating the MEA holding suction mechanism and, in this condition, the mold was clamped. The resin was injected at a rate of 250 mm/second and, after cooling, the membrane electrode assembly with the resin frame applied thereto was recovered using the automatic transfer machine.

Example 2

A membrane electrode assembly provided with a resin frame having a shape such as shown in FIG. 11 was fabricated in the same manner as Example 1, except that a projection having a step height of 0.005 mm was provided when making the mold. It was confirmed that, even with the step height as small as 0.005 mm, the desired projection shape can be conferred to the resin frame in accordance with the method of the present invention.

Example 3 (Comparative Example)

A platinum-loaded carbon catalyst layer PRIMEA 5510 (registered trademark) (manufactured by Japan Gore-Tex) having a size of 5×5 cm and carrying platinum in an amount of 0.3 mg/cm$^2$ was deposited as an electrode on each side of a polymer electrolyte membrane formed from an ion exchange membrane GORE-SELECT (registered trademark) (manufactured by Japan Gore-Tex) having a size of 7.6×7.6 cm and a thickness of 30 μm. Next, a gas diffusion layer CARBEL (registered trademark) (manufactured by Japan Gore-Tex, CNW10A) having a size of 5×5 cm and a thickness of 150 μm was deposited as a diffusion layer on each electrode, to obtain an MEA having an electrolyte membrane size of 7.6×7.6 cm and an electrode size of 5×5 cm. After that, using the mold made in Example 1, the resin frame was injection-molded in the same manner as Example 1, to produce the membrane electrode assembly with the resin frame applied thereto.

Example 4 (Comparative Example)

A platinum-loaded carbon catalyst layer PRIMEA 5510 (registered trademark) (manufactured by Japan Gore-Tex) having a size of 8×8 cm and carrying platinum in an amount of 0.3 mg/cm$^2$ was deposited as an electrode on each side of a polymer electrolyte membrane formed from an ion exchange membrane GORE-SELECT (registered trademark) (manufactured by Japan Gore-Tex) having a size of 8×8 cm and a thickness of 30 μm. Next, a gas diffusion layer CARBEL (registered trademark) (manufactured by Japan Gore-Tex, CNW10A) having a size of 8×8 cm and a thickness of 150 μm was deposited as a diffusion layer on each electrode, to form a membrane-electrode structure precursor sheet having an electrolyte membrane size of 8×8 cm and an electrode size of 8×8 cm. Then, an MEA measuring 52×52 mm was segmented from the membrane-electrode structure precursor sheet. The corners of the MEA were each rounded with a radius of curvature of 1.0 mm. After that, using the mold made in Example 1, the resin frame was injection-molded in the same manner as Example 1, to produce the membrane electrode assembly with the resin frame applied thereto.

Example 5 (Comparative Example)

An MEA measuring 52×52 mm, with each corner rounded with a radius of curvature of 1.0 mm, was fabricated in the same manner as Example 4.

A resin frame was produced by forming a hole having outer dimensions of 51.5×51.5 mm in the center of a resin film (TORELINA, manufactured by Toray) having a thickness of 0.35 mm and outer dimensions of 76×76 mm.

The resin frame was placed on the MEA with the inner circumference of the former evenly overlapping the outer circumference of the latter; then, the MEA was press-fitted into the resin frame under heat and pressure (200° C., $9.8 \times 10^5$ Pa, 3 minutes) by using a hot press, to produce the membrane electrode assembly with the resin frame applied thereto.

Leak Test

A leak test was conducted to check the reliability of the seal in the solid polymer electrolyte fuel cell having the membrane electrode assembly fabricated in each example. In the leak test, the membrane electrode assembly was set in a jig mimicking a cell, and the entire assembly was immersed in water; in this condition, compressed air was fed into one side of the membrane electrode assembly, and generation of bubbles from the opposite side was checked. At this time, the pressure of the compressed air was gradually raised from 0 MPa, and the pressure at which bubbles were generated from the opposite side was recorded as a leak pressure.

In the above leak test, the membrane electrode assembly of Example 1 recorded a leak pressure of 0.3 MPa or higher. On the other hand, in the membrane electrode assemblies of Example 3 (Comparative Example), Example 4 (Comparative Example), and Example 5 (Comparative Example), bubbles were generated immediately after the pressure was raised (that is, the moment the pressure was applied).

Potential for Exploitation in Industry

According to the present invention, the reliability, mechanical strength, and handling characteristics of the seal in the solid polymer electrolyte fuel cell are enhanced.

Because of the enhanced mechanical strength and handling characteristics, a fuel cell stack can be assembled with good accuracy and in a simple manner. Further, according to the present invention, the manufacturing cost of the solid polymer electrolyte fuel cell is reduced by reducing the required area size of the electrolyte membrane. Furthermore, according to the present invention, the production efficiency of the solid polymer electrolyte fuel cell is enhanced by reducing the number of fabrication steps.

What is claimed is:

1. A membrane electrode assembly for use in a solid polymer electrolyte fuel cell, comprising:
   a membrane-electrode structure which includes
   a polymer electrolyte membrane,
   a first electrode layer provided on one side of said electrolyte membrane,
   a first gas diffusion layer provided on an opposite side of said first electrode layer from said electrolyte membrane,
   a second electrode layer provided on the other side of said electrolyte membrane, and
   a second gas diffusion layer provided on an opposite side of said second electrode layer from said electrolyte membrane; and
   a resin frame which is provided in such a manner as to fully enclose an outer periphery of said electrolyte membrane and to enclose at least portions of outer peripheries of said first and second gas diffusion layers, said resin frame being provided so as to enclose said electrolyte membrane side, and wherein
   said first gas diffusion layer and said first electrode layer are stacked on a surface of said electrolyte membrane so that the outer periphery of said first gas diffusion layer entirely lies within a boundary defined by the outer periphery of said electrolyte membrane and so that a surface region of said electrolyte membrane is left exposed between the outer periphery of said first electrode layer and the outer periphery of said electrolyte membrane, all around the outer periphery of said first electrode layer,
   said second gas diffusion layer extends as far as at least a portion on a side opposite from said surface region, all around the outer periphery of said electrolyte membrane,
   said resin frame is attached fixedly to at least a portion of said surface region, and
   wherein said electrolyte membrane comprises two membranes having different area sizes, and the membrane located on the side that contacts said first electrode layer has the same area size as said first gas diffusion layer and is aligned in precise registry with said first gas diffusion layer, while the membranes located on the side that contacts said second electrode layer has the same area size as said second gas diffusion layer and is aligned in precise registry with said second gas diffusion layer.

2. A membrane electrode assembly as claimed in claim 1, wherein said resin frame is applied by die molding.

3. A membrane electrode assembly as claimed in claim 2, wherein said die molding is injection molding, reaction injection molding, or transfer molding.

4. A membrane electrode assembly as claimed in claim 1, wherein said electrolyte membrane and said second gas diffusion layer have the same area size and are aligned in precise registry with each other.

5. A membrane electrode assembly as claimed in claim 1, wherein said first electrode layer and/or said second electrode layer have the same area size as said first gas diffusion layer and/or said second gas diffusion layer, respectively, and are aligned in precise registry with said first gas diffusion layer and/or said second gas diffusion layer, respectively.

6. A membrane electrode assembly as claimed in claim 1, wherein said resin frame is provided with a reactant gas flow passage.

7. A membrane electrode assembly as claimed in claim 1, wherein said resin frame is provided with a projection for sealing purposes.

8. A membrane electrode assembly as claimed in claim 1, wherein said resin frame is provided with a sealing member inserted therein.

9. A membrane electrode assembly as claimed in claim 1, wherein said resin frame is provided with a sealing member formed by double molding.

10. A membrane electrode assembly as claimed in claim 1, wherein said resin frame is provided with a separator positioning means.

11. A membrane electrode assembly as claimed in claim 1, wherein a reinforcing member is provided inside said resin frame.

12. A membrane electrode assembly as claimed in claim 1, wherein a sealing member is separately provided outside said resin frame.

13. A membrane electrode assembly as claimed in claim 1, wherein a separator positioning means is separately provided outside said resin frame.

14. A solid polymer electrolyte fuel cell comprising a membrane electrode assembly described in claim 1.

* * * * *